W. S. PALMER.
COMBINATION ICE SAW AND PICK.
APPLICATION FILED DEC. 14, 1917.
1,266,982. Patented May 21, 1918.
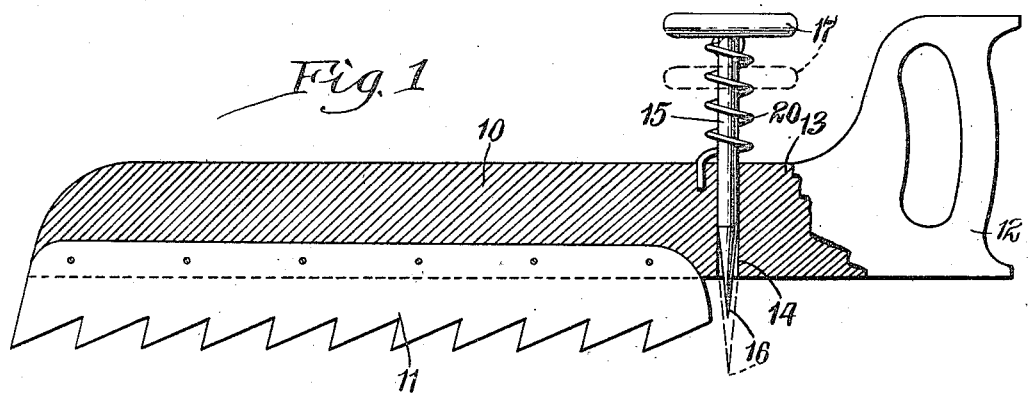
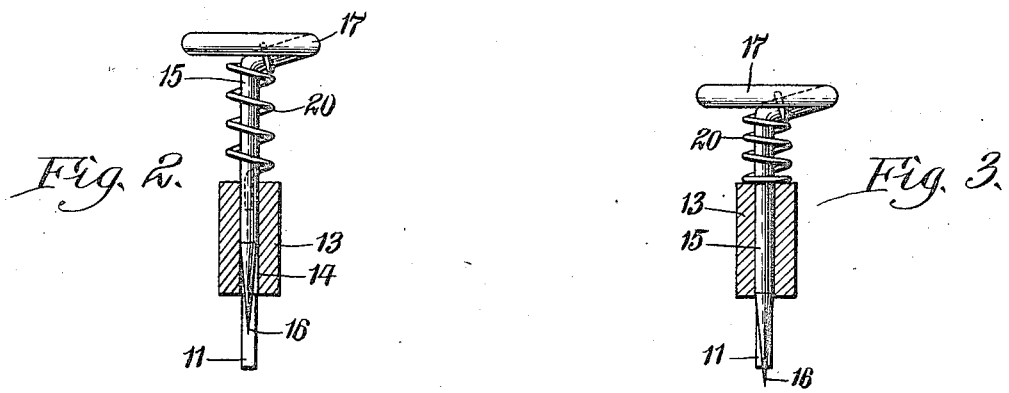
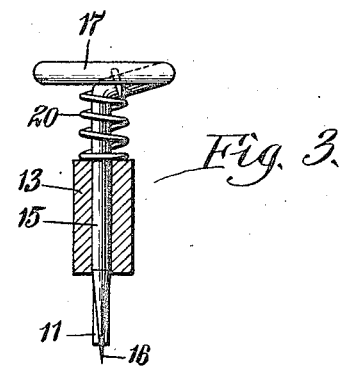
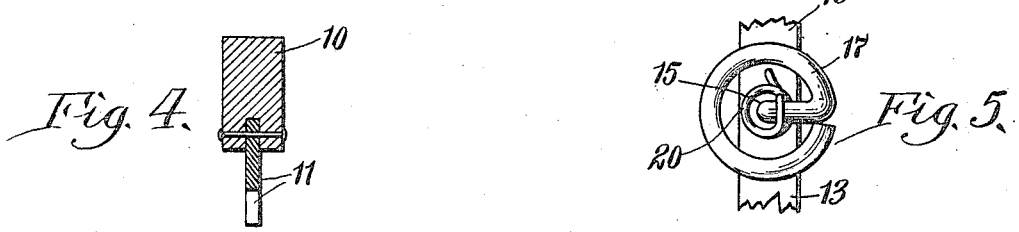
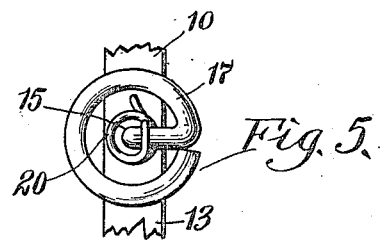
Inventor
W. S. Palmer
By H. S. Woodward
Attorney

UNITED STATES PATENT OFFICE.

WINFIELD SCOTT PALMER, OF GLENBURN, PENNSYLVANIA.

COMBINATION ICE SAW AND PICK.

1,266,982.  Specification of Letters Patent.  Patented May 21, 1918.

Application filed December 14, 1917. Serial No. 207,118.

*To all whom it may concern:*

Be it known that I, WINFIELD S. PALMER, a citizen of the United States, residing at Glenburn, in the county of Lackawanna and State of Pennsylvania, have invented certain new and useful Improvements in Combination Ice Saws and Picks, of which the following is a specification.

The invention has for an object to provide an appliance for cutting blocks of ice by hand rapidly and efficiently and with extreme accuracy, while at the same time avoiding excessive waste by chipping and irregular fractures.

The principal aim of the invention is to give in one appliance a device for cutting a sufficiently deep kerf in an ice block and also a pick whereby the block will be split in a plane coinciding with the kerf cut, without requiring the use of more than one tool or the removal of the tool from the work. It is a further purpose to effect novel improvements in the specific construction of such an appliance whereby to facilitate its use and improve its manufacture.

Additional features of merit will appear from the construction arrangement and combination of parts of the device as hereinafter described and shown more particularly in the drawings, wherein, Figure 1 is a side elevation of one embodiment of the invention, partly in section, Fig. 2 is a cross-section, in normal initial position of the pick element, Fig. 3 is a similar view showing the pick device in operative position, Fig. 4 is a cross-sectional view of the saw blade and mounting, Fig. 5 is a top view of the pick element.

There is illustrated a saw backing and handle element 10, which may be formed of wood having a kerf in its lower edge adapted to receive snugly the saw blade 11, which is preferably formed with quite large teeth, and is preferably somewhat thicker than the ordinary carpenter's saw. It is found that no swaging or set of the teeth is necessary. The grip portion 12 of the back element is formed in a manner similar to that of the usual carpenter's saw, and is formed with a shank portion 13, between the grip and the end of the blade 11, several inches in extent, longitudinally. A vertical guide passage 14 is formed through the shank portion 13 alined with the blade 11 and having vertically reciprocable therein a pick element 15, in the present instance formed of metal circular in cross section and having a greatly tapered point portion 16 presented downwardly close behind the rear end of the blade 11, although this point may have other shapes in cross section, as may be found desirable. The pick in the present instance may be formed of heavy wire, having its upper end bent abruptly to one side and extended slightly upward at an oblique angle, and at a short distance from the axis of the vertical portion of the pick bent into an annular head portion 17. The annular portion 17 is of a form slightly less than the width of the average hand, so that when struck by the palm of an operator it will produce a minimum of discomfort. A helical supporting and retaining spring 20 is mounted between the portion 17 of the head and the upper side of the back 10, the spring having its outer end portion bent snugly around the laterally turned part 17 of the pick, and having its inner end suitably fixed in the back 10, the spring being of such a shape that when in its maximum extended position free from stress, the pick will be held in the guide passage 14 with its point located a short distance above the plane of the points of the teeth on the blade 11.

The point 16 is preferably so tapered and the blade 11 made of such width that when the device has been used to cut a kerf in a block of ice to the full depth of the blade 11 or until the backing 10 rests upon the surface of the bar, the point will engage the bottom of the kerf slightly before or about the same time that the sides of the pick become wedged between the sides of the kerf, so that a slight fracturing of the ice at the bottom of the kerf will have been accomplished when the wedging action of the pick in the ice is at its fullest efficiency.

In use of the appliance, the device is used after the manner of an ordinary saw, to saw a kerf across the top of a block of ice to be split, the saw being preferably moved while held in parallel relation to the mean plane of the upper side of the block, until a kerf has been cut thereacross to or nearly to the full depth of the blade 11. The saw is then moved slowly across the block, while a succession of blows are delivered upon the head 18 of the pick, the movement of the saw during this operation being checked when the pick engages near the ends of the kerf cut in the block, and in this way, the block will be cut squarely in a plane alined with the kerf, with a minimum of irregularity, so that an accurate cutting of large blocks of ice may be accomplished by ice-men and others.

In the use of the device, the saw blade 11 serves as a guiding element to hold the pick in line with the kerf while being moved into a central position for use, and handle 12 and the back portion 10 are easily convenient for operating the saw and adjustment of a pick.

What is claimed is

1. A combination ice saw and pick comprising a blade-holding back element having a toothed blade mounted therein and having a grip portion rearwardly thereof a distance, a reciprocable pick device carried by the back in alinement with the plane of the saw and outwardly of one end thereof, and means to support the pick in raised position at times.

2. A combination ice saw and pick comprising a blade-holding back element having a toothed blade mounted therein and having a grip portion rearwardly thereof a distance, a reciprocable pick device carried by the back in alinement with the plane of the saw and outwardly of one end thereof, and means to support the pick in raised position at times, said pick comprising a rectilinear body portion having a finely tapered point having a thickness less than that of the saw transversely at a distance from the point corresponding to the depth of the blade below said back element.

3. A tool of the character described comprising a back element having a saw blade set in the lower side thereof and extending a distance rearwardly of the blade, a grip portion at the rear extremity of said back, located above said lower side, a vertical passage being formed in said back element between the grip and blade alined with the plane of the blade, a reciprocable pick element slidable therein, a spring connected to the back and to the pick tending to support the pick in a predetermined initial position and to hold the pick against withdrawal from the back, and a head on the pick for engagement by the palm of the hand.

4. In a device of the character described, a pick holder having a vertical passage therethrough, a vertically slidable pick element therein, means thereon to guide the pick centrally of a kerf in an ice block, and a handle on the holder located above the lower side of the holder.

In testimony whereof I have affixed my signature in presence of two witnesess.

WINFIELD SCOTT PALMER.

Witnesses:
H. L. WOODWARD,
CHR. NIELSEN, Jr.

Copies of this patent may be obtained for five cents each, by addressing the "Commissioner of Patents, Washington, D. C."